United States Patent [19]

Pagel

[11] 4,145,932
[45] Mar. 27, 1979

[54] PRESSURE TRANSDUCER

[75] Inventor: Ernst-Olav Pagel, Böhmfeld, Fed. Rep. of Germany

[73] Assignee: Robert Bosch GmbH, Stuttgart, Fed. Rep. of Germany

[21] Appl. No.: 897,986

[22] Filed: Apr. 20, 1978

[30] Foreign Application Priority Data

Jun. 8, 1977 [DE] Fed. Rep. of Germany ....... 2725933

[51] Int. Cl.² .................... G01L 9/10; G01M 15/00
[52] U.S. Cl. .................................. 73/753; 73/119 A
[58] Field of Search ............. 73/753, 722, 728, 119 A, 73/386, 387; 261/76; 336/30

[56] References Cited

U.S. PATENT DOCUMENTS 3,745,817  7/1973  Williams et al. ................. 73/119 A

OTHER PUBLICATIONS

"Electronic Fuel Injection . . .", Electronics, Sep. 11, 1972, pp. 121–125.

*Primary Examiner*—Donald O. Woodiel
*Attorney, Agent, or Firm*—Edwin E. Greigg

[57] ABSTRACT

A pressure transducer, especially for measuring induction tube pressure in an internal combustion engine. The transducer includes an electrical inductor with a movable core displaced by pressure differences. The inductor is connected to a power source across a switch actuated by periodic triggering pulses. The voltage across the inductor is applied to a threshold detector which generates a binary level output signal, the duration of which is related to the inductive impedance of the inductor and thus to pressure. A logic gate receives the triggering pulses and the threshold detector output and generates an output pulse whose duration is related to the pressure. In another embodiment, the binary level output signal from the threshold detector is the output signal of the transducer.

6 Claims, 3 Drawing Figures

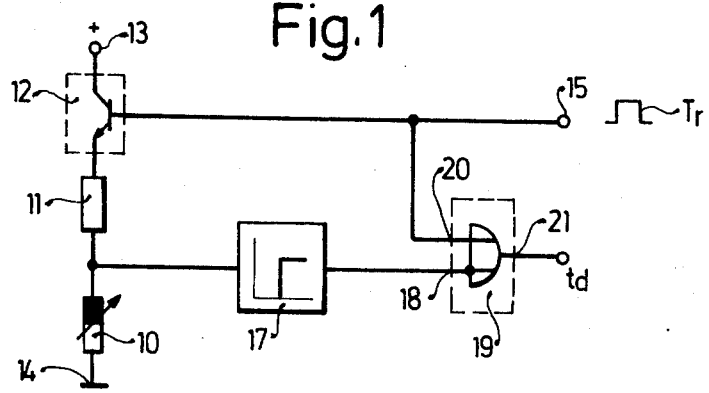
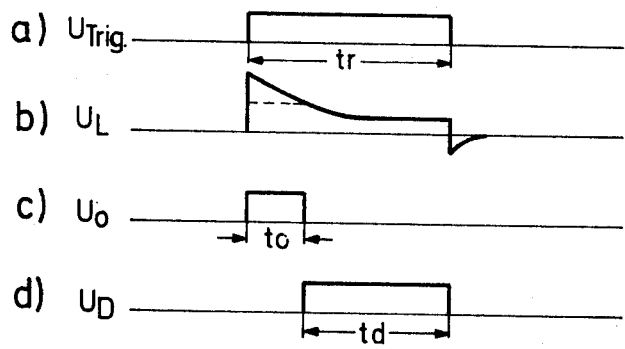
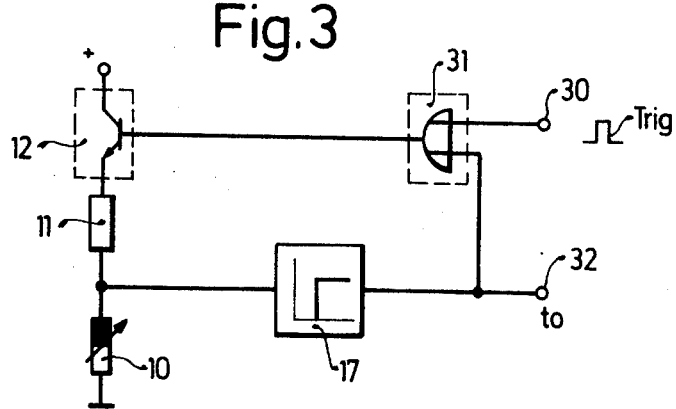

PRESSURE TRANSDUCER

BACKGROUND OF THE INVENTION

The invention relates to the field of transducers. More particularly, the invention relates to a pressure transducer which generates an electrical signal that varies according to varying ambient pressure. In known pressure transducers of this type, a pressure sensor or pressure chamber may displace the core of a coil and thus change its inductance. When an alternating voltage is applied to the coil, the amplitude of the resulting voltage is a function of the varying impedance of the coil, i.e., of the pressure. The output signal of the known pressure transducer is thus an analog signal. When a digital fuel injection system requires the use of a pressure signal, an analog-to-digital converter must be inserted between the known pressure transducer and the fuel injection system. This converter constitutes an additional cost and is also a cause of potential failure.

OBJECT AND SUMMARY OF THE INVENTION

It is thus a principal object of the present invention to provide a pressure transducer that supplies a digital output signal and thus permits controlling a digital fuel injection system without an analog-to-digital converter. It is a further object of this invention to provide a pressure-to-voltage transducer in which the digital output pulse has a duration which is a function of the magnitude of the pressure experienced by the transducer.

These and other objects are attained according to the invention by providing a pressure transducer having an element whose inductance is dependent on pressure and to connect this inductive element to a switch which periodically energizes the coil. The voltage drop across the coil is applied to a threshold switch, whose output is applied to one input of a logic gate, the other input of which receives the triggering pulse for the switch. In a first embodiment of the circuit, the duration of the switch trigger pulse is calibrated so that the output signal of the transducer is zero when the external relative pressure is zero. In a simplified embodiment, the output signal is a function of pressure but the zero output signal does not necessarily correspond to a zero relative pressure.

The invention will be better understood as well as further objects and advantages thereof become more apparent from the ensuing detailed description of preferred exemplary embodiments taken in conjunction with the drawing.

BRIEF DESCRIPTION OF THE DRAWING

FIG. 1 is a circuit diagram of a first embodiment of a pressure transducer according to the present invention;

FIG. 2 is a timing diagram illustrating the occurrence of pulses in various parts of the circuit of FIG. 1; and FIG. 3 is a circuit diagram of a second exemplary embodiment of a pressure transducer according to the present invention.

DESCRIPTION OF THE PREFERRED EMBODIMENTS

Turning now to FIG. 1, there will be seen illustrated a circuit including an inductive element 10 whose inductance varies as a function of the ambient pressure. This element is a known component and is not described in further detail. It may include, for example, a pressure-sensitive diaphragm which shifts the position of an iron core in a solenoid. The inductive element 10 is connected between a source of ground potential 14 and a source of battery power 13. In the exemplary embodiment shown, the battery source 13 is at positive potential but it will be appreciated by persons skilled in the art that the polarities of the indicated circuit are arbitrary, provided that the switching elements and other circuit components are compatible with the indicated polarity. Connected in series with the inductive element 10 is a resistor 11 and a switch 12, shown in this exemplary embodiment as a transistor. The control electrode of the transistor 12 is an input contact 15 which receives square trigger pulses of the width tr. A threshold switch 17 is connected between the junction of the inductive element 10 and the resistor 11 while its output feeds one input of a logic gate 19, another input of which is connected to the contact 15. The output 21 of the logic gate 19 represents the signal output of the pressure transducer according to the present embodiment.

The threshold switch 17 may be of a known type which provides a first digital output level when the input signal exceeds a certain level while it provides a second logical output level when the input signal falls below a certain predetermined voltage level. The two threshold levels may be different, i.e., the threshold circuit 17 may include hysteresis, for example in the manner of a Schmitt trigger.

In the embodiment shown, the logic gate 19 is an OR gate, one of whose inputs 18 is a negating input.

The manner of operation of the circuit illustrated in FIG. 1 will now be explained with the aid of the timing diagram of FIG. 2. The triggering voltage tr is applied to the input 15 and is illustrated in FIG. 2a. When the triggering pulse tr is applied to the input contact 15, the switching transistor 12 is rendered conducting and applies a potential across the inductive element 10 which decreases from an initial maximum to a steady-state value due to the inductive impedance of the inductive element 10. The voltage at the point feeding the input of the threshold switch 17 is illustrated in FIG. 2b. As the current through the inductive element 10 increases, the voltage is reduced in exponential fashion. When the input voltage at the threshold switch crosses the first threshold, the output switches from its first state to its second state while it switches back to its first state when the voltage $U_L$ shown in FIG. 2b crosses the second threshold or re-crosses the first threshold. Accordingly, the output of the threshold detector 17 is the pulse shown in FIG. 2c having a duration $t_0$. The subsequent OR gate 19 generates an output signal constituting the difference between the pulses tr and $t_0$ as indicated in FIG. 2d. The duration of the output pulse from the OR gate 19 is a pulse of width td.

If it is intended to use the pressure transducer of the present invention as a differential pressure sensor, it is suitable to so adjust the duration tr of the input trigger pulse that the output of the gate 19, i.e., the pulse of width td, has zero width when the pressure is zero. With increasing pressure, the width of the pulse td increases together with the increase in pressure, while the frequency of the output pulses is equal to the frequency of the input pulses tr.

A second embodiment of the invention as illustrated in FIG. 3 is similar to the first embodiment but the output pulse from the transducer is not zero even when the pressure is zero. In this embodiment, the input trigger pulse arrives at a contact 30 which is one input of an OR gate 31. The second input of the OR gate is connected to the output of the threshold switch 17. The output of the OR gate in turn provides the switching pulse for the switch 12. When a positive trigger pulse arrives at the input 30, it is switched through to the switch 12 by the gate 31, thereby causing conduction of the switch and an abrupt increase of the voltage across the pressure-sensitive inductive element 10. Accordingly, the threshold switch 17 produces an output signal which is applied directly to the output of the transducer but is also applied to the second input of the OR gate 31. Accordingly, this pulse holds the switch 12 in conduction so that the change of the current through the inductive element 10 and the subsequent change in the voltage across it takes place just as described in the example of FIG. 1 even if the triggering pulse at the contact 30 is terminated. The output signal at the output 32 will be the same as that illustrated in FIG. 2c. However, in this case, no adjustment of the triggering pulse width can be made to result in a disappearance of the output pulse when the pressure is zero.

The two exemplary embodiments of the pressure transducer of the invention generate an output pulse whose width is pressure-dependent. The frequency of occurrence of the output pulse is directly equal to the frequency of the input trigger pulses. Accordingly, the number of pressure measurements taking place within a given time interval is thus arbitrarily selectable and can be adapted to the requirements of the subsequent controller.

The foregoing relates to preferred exemplary embodiments of the invention, it being understood that other embodiments and variants thereof are possible within the spirit and scope of the invention.

What is claimed and desired to be secured by Letters Patent of the United States is:

1. A pressure transducer, for generating an electrical pulse whose duration is related to pressure, and including a variable inductive element whose inductance changes as a function of pressure and wherein the improvement comprises:
    an electrical switch, connected in series with said inductive element to provide current thereto, said electrical switch being opened and closed by triggering pulses;
    a threshold detector, having an input connected to said inductive element, for generating a binary level output signal in dependence on the voltage present at said input; and
    a logic gate having a first input connected to said threshold detector for receiving said binary level output signals and having a second input connected to receive said triggering pulses; whereby the output of said logical gate is a pulse whose duration is equal to the difference between the duration of said binary level output signal from said threshold detector and the duration of one of said triggering pulses.

2. A pressure transducer as defined by claim 1, wherein said logic gate is an OR gate and said first input is a negating input.

3. A pressure transducer, for generating an electrical pulse whose duration is related to pressure, and including a variable inductive element whose inductance changes as a function of pressure and wherein the improvement comprises:
    an electrical switch, connected in series with said inductive element to provide electrical current thereto;
    a logic gate whose output is connected to said electrical switch for the purpose of opening and closing the same and having a first input for receiving triggering pulses and a second input;
    a threshold detector, for generating a binary level output signal in dependence on the voltage present at an input connected to said inductive element, said binary level output signal being applied to said second input of said logic gate;
    whereby said binary level output signal is said electrical pulse whose duration is related to pressure.

4. A pressure transducer as defined by claim 3, wherein said logic gate is an OR gate.

5. A pressure transducer as defined in claim 3, further defined in that said threshold detector has at least one controllable threshold level.

6. A pressure transducer as defined by claim 1, further defined in that said threshold detector has at least one controllable threshold level.

* * * * *